United States Patent [19]

Fukushima et al.

[11] 4,433,564
[45] Feb. 28, 1984

[54] SCROLL MANUFACTURING TOOL

[75] Inventors: Eiji Fukushima, Fujimi; Seiichi Fukuhara, Gunma; Masaharu Hiraga, Honjo, all of Japan

[73] Assignee: Sanden Corporation, Gunma, Japan

[21] Appl. No.: 380,141

[22] Filed: May 20, 1982

[30] Foreign Application Priority Data

May 20, 1981 [JP] Japan .................. 56-76138

[51] Int. Cl.³ ............................................. B21C 47/00
[52] U.S. Cl. ....................................... 72/146; 72/478
[58] Field of Search ............... 72/146, 147, 148, 115, 72/120, 121, 125, 414, 478; 418/6, 55, 57, 59, 191; 29/23.5, 156.4 R, 156.4 WL, 156.8 R, 156.8 CF, 156.8 B, 527.7, 558

[56] References Cited

U.S. PATENT DOCUMENTS

| | | | |
|---|---|---|---|
| 801,182 | 10/1905 | Cruex | 418/55 X |
| 2,203,315 | 6/1940 | Vivie | 72/147 X |
| 3,608,349 | 9/1971 | Greiner et al. | 72/146 |
| 3,994,635 | 11/1976 | McCullough | 418/55 |
| 4,082,484 | 4/1978 | McCullough | 418/55 |
| 4,199,308 | 4/1980 | McCullough | 418/55 |
| 4,395,205 | 7/1983 | McCullough | 418/55 |
| 4,403,494 | 9/1983 | McCullough | 72/360 |

FOREIGN PATENT DOCUMENTS 54-159712  12/1979  Japan .............................. 29/156.8 R

OTHER PUBLICATIONS

"Mass Production Manufacturing Techniques for Scroll Components", Jan. 1979, pp. 10–15.

*Primary Examiner*—E. Michael Combs
*Attorney, Agent, or Firm*—Schuyler, Banner, Birch, McKie & Beckett

[57] ABSTRACT

A manufacturing tool for finishing a preformed scroll for use in a scroll type fluid displacement apparatus is disclosed. The tool includes a working member having an end plate and a first involute element extending from one end surface of said end plate. The end plate has a plurality of arc shaped holes along the outer side wall of the first involute element. A second involute element is rotatably coupled to the working member and interfits with the first involute element in a disposition to define a radial gap between the first and second involute elements. A plurality of pins project axially from an axial end of the second involute element and penetrate through the arc shaped holes. A rotatable member has a plurality of holes extending in the axial direction. The pins have axial end portions which extend into the holes in the rotatable member to couple the rotatable member to the second involute member and to transmit the rotation of the rotatable member to the second involute element so that the relative rotation between the first and second involute elements adjusts the gap between them.

4 Claims, 8 Drawing Figures

SCROLL MANUFACTURING TOOL

BACKGROUND OF THE INVENTION

The present invention relates to a scroll type fluid displacement apparatus, and more particularly, to a tool for manufacturing the scroll of a scroll type fluid displacement apparatus.

Scroll type fluid displacement apparatus are well known in the prior art. For example, U.S. Pat. No. 801,182 (Cruex) discloses a fluid displacement apparatus including two scrolls, each having a circular end plate and a spiroidal or involute spiral element. Both scrolls are maintained at an angular and radial offset so that the spiral elements interfit to make a plurality of line contacts between their spiral curved surfaces to thereby seal off and define at least one pair of fluid pockets. The relative orbital motion of the scrolls shifts the line contacts along the spiral curved surfaces and, as a result, the volume of the fluid pockets changes. Since the volume of the fluid pockets increases or decreases dependent on the direction of the orbital motion, scroll type fluid displacement apparatus are applicable to compress, expand or pump fluids.

FIG. 1 of the drawings illustrates a basic design of a scroll 1 suitable for use in a scroll type fluid displacement apparatus. Scroll 1 includes a circular end plate 2 and a wrap or involute spiral element 3 affixed to or extending from one end surface of end plate 2. A scroll type fluid displacement apparatus includes a pair of such scrolls, both of which are maintained at an angular and radial offset so that they interfit to form a plurality of line and axial contacts to define at least one pair of sealed off fluid pockets. In such apparatus, each sealed off fluid pocket is defined by the line contacts between interfitting spiral elements and the axial contacts between the axial end surface of each spiral element and the inner end surface of the end plate of the other scroll. The volume of the pocket is thereby defined by the line contacts and the axial contacts.

The scroll is generally formed from single pieces of metal by a machining process such as milling. However, a milling machine process consumes a great deal of time and energy; it also produces large quantities of waste metal. If the scroll is formed by casting or forging, and if the axial dimensions of the spiral element must be made relatively long to obtain a large volume or high capacity, the draft angle of the mold must be made large. After forming in such a mold, a large amount of machining of the spiral element is required to obtain uniform wall thickness; as a result, relatively large quantities of waste metal are produced and a great deal of time and energy are expended. Furthermore, this manufacturing process makes it difficult to attain high accuracy of the wall dimensions of the spiral element.

In order to avoid these disadvantages in single piece construction of a scroll, U.S. Pat. No. 3,994,635 (McCullough) discloses a scroll consisting of two pieces. The scroll is formed of a separate end plate and spiral element. The end plate has an involute configured groove on one side surface and the separate spiral element is seated in the groove. However, in this construction, the process of seating the spiral element in the groove is intricate. Also, after seating the spiral element, finishing the surface of the end plate and the spiral element is intricate and difficult. Finally, in comparison with single piece scrolls, the reliability of two piece scrolls is inferior.

SUMMARY OF THE INVENTION

It is a primary object of the present invention to provide an improved manufacturing tool for finishing preformed single piece scrolls used in scroll type fluid displacement apparatus.

It is another object of this invention to provide a manufacturing tool for finishing a preformed single piece scroll in a simple finishing process.

A manufacturing tool for finishing a preformed scroll for use in a scroll type fluid displacement apparatus according to this invention includes a working member with a first involute element, a separate second involute element and a rotatable member. The working member has an end plate, the first involute element and a drive shaft. The first involute element extends from one end surface of the end plate and the drive shaft extends from the other end surface. The end plate has a plurality of arc shaped holes which are located along the outer side wall of the first involute element. Outer and inner side walls of the arc shaped hole consist of arcs the centers of which are concentric with the center of the first involute element. The second involute element has a plurality of pins extending from one of its axial end surfaces. The pins extend through the holes in the end plate of the working member so that the second involute element interfits with the first involute element with a radial gap. The rotatable member has a plurality of holes into which the axial end portions of the pins fit and a tubular shaft for rotatably supporting the drive shaft of the working member. The drive shaft and the tubular shaft are connected to rotational power sources and can be rotated in opposite directions. The radial gap between the inner side wall of the first involute element and the outer side wall of second involute element defines the working space for finishing the scroll. Because of the relative rotation of the involute elements the working space can be reduced to effect the coining of the scroll. The finishing of preformed scroll can thus be done by a simple process.

Further objects, features and other aspects of this invention will be understood from the following detailed description of the preferred embodiment of this invention referring to the annexed drawings.

DETAILED DESCRIPTION OF THE PREFERRED EMBODIMENT

Figure 1:
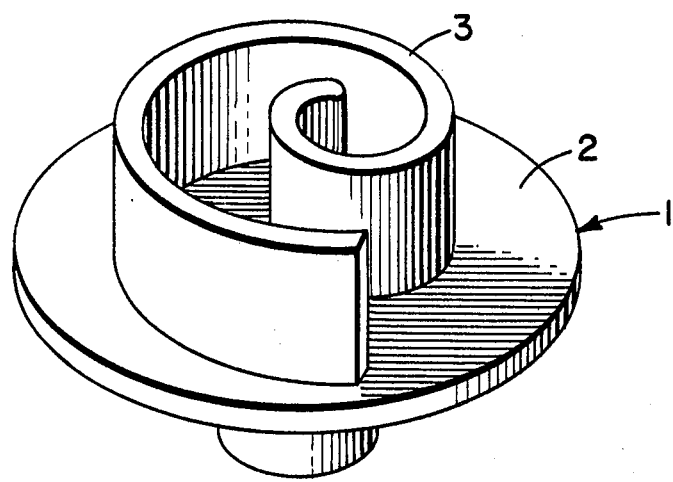
FIG. 1 is a perspective view of a scroll for use in a scroll type fluid displacement apparatus.
Figure 2:
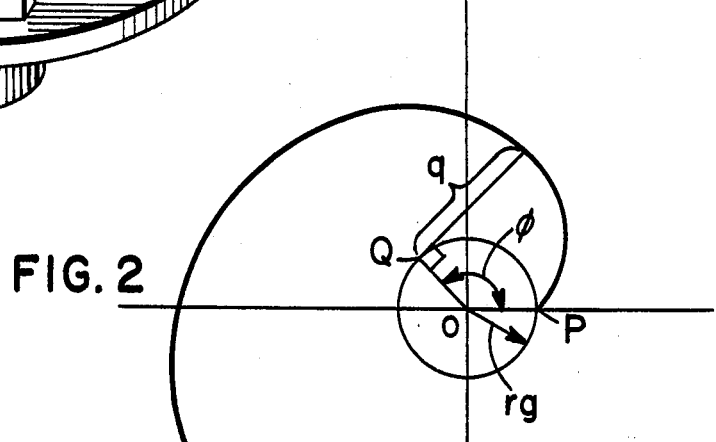
FIG. 2 is a diagram illustrating properties of an involute of a circle.
Figure 3:
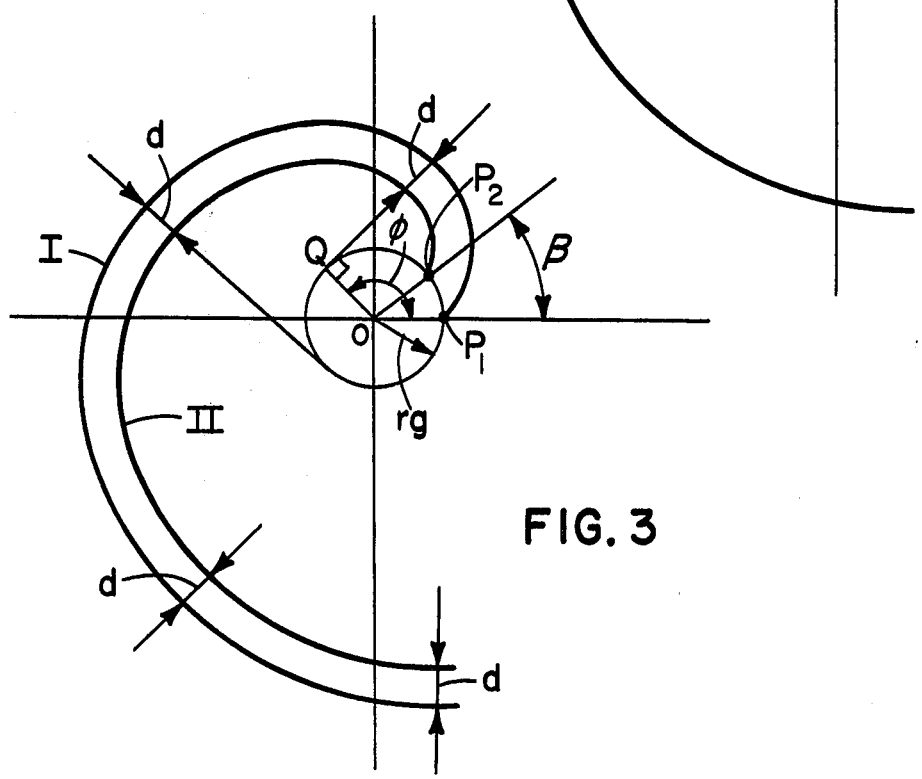
FIG. 3 is a diagram of two involutes illustrating basic properties of an involute wrap of a scroll.

Before the preferred embodiment of this invention is described, principle properties of involute contours, which are used to form spiral elements for scroll type fluid displacement apparatus, will be described with reference to FIGS. 2-4.

Generally, a side wall of the spiral element follows an involute of a circle. FIG. 2 shows such an involute of a circle. This involute is formed by beginning at a starting point P of the generating circle and tracing the involute from the end of an inextensible string unwinding from point P. The curvature of the involute, i.e., the length $\rho$ along a tangent from the generating circle to the intersection of the involute surface, is given by $\rho = \phi \cdot rg$, where $\phi$ is the involute angle and rg is a radius of the generating circle. FIG. 3 illustrates two involutes, one involute I starts at point $P_1$ on the generating circle, and the other involute II starts at point $P_2$ on the generating circle. Point $P_2$ is located at an angular offset of $\beta$ from point $P_1$. Since, length $L_1$ along the tangent from the generating circle to the intersection of involute I surface is given by $L_1 = \phi \cdot rg$ and length $L_2$ along the tangent from the generating circle to the intersection of involute II surface is given by $L_2 = (\phi - \beta) \cdot rg$, the distance d between the both involutes I and II is given by $d = L_1 - L_2 = \phi \cdot rg - (\phi - \beta) \cdot rg = \beta \cdot rg$. Thus, the distance between involutes I and II is uniform and is not influenced by the involute angle at which the distance is measured.

Figure 4:
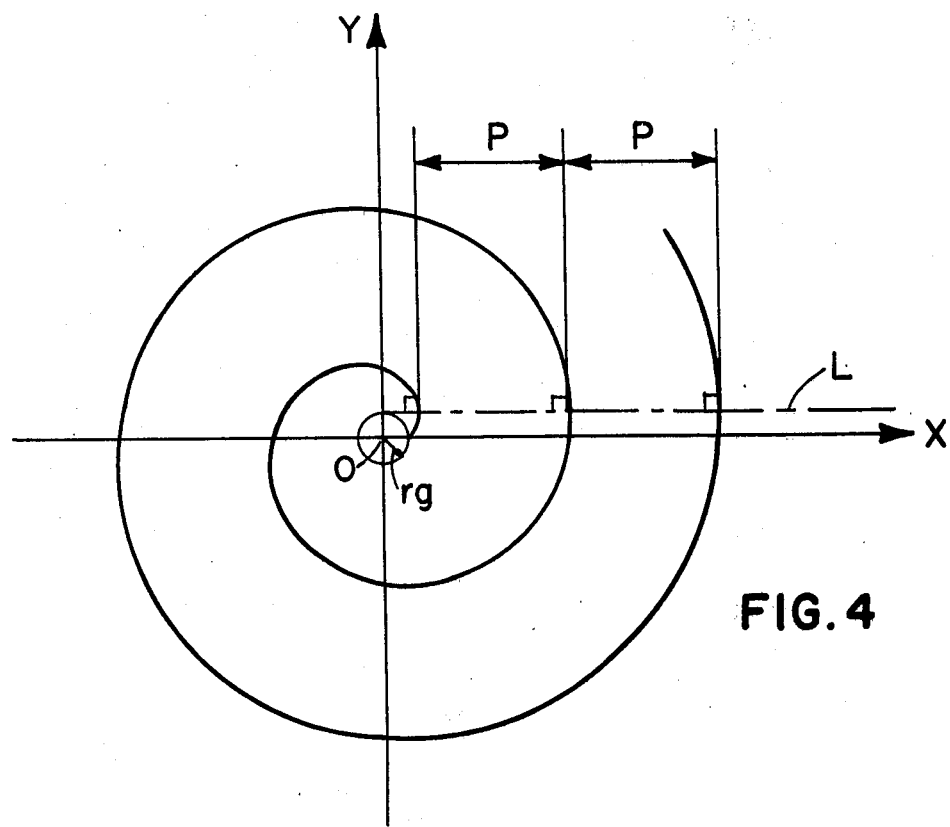
FIG. 4 is a diagram illustrating another property of an involute of a circle.

FIG. 4 illustrates another property of an involute of a circle. A line L is drawn tangent to the generating circle and intersects the involute surface at a plurality of points. The distance between these points of intersection is uniform and defines the pitch P of the involute. The pitch P is thus periodic and defined by $P = 2\pi \cdot rg$.

Figure 5:
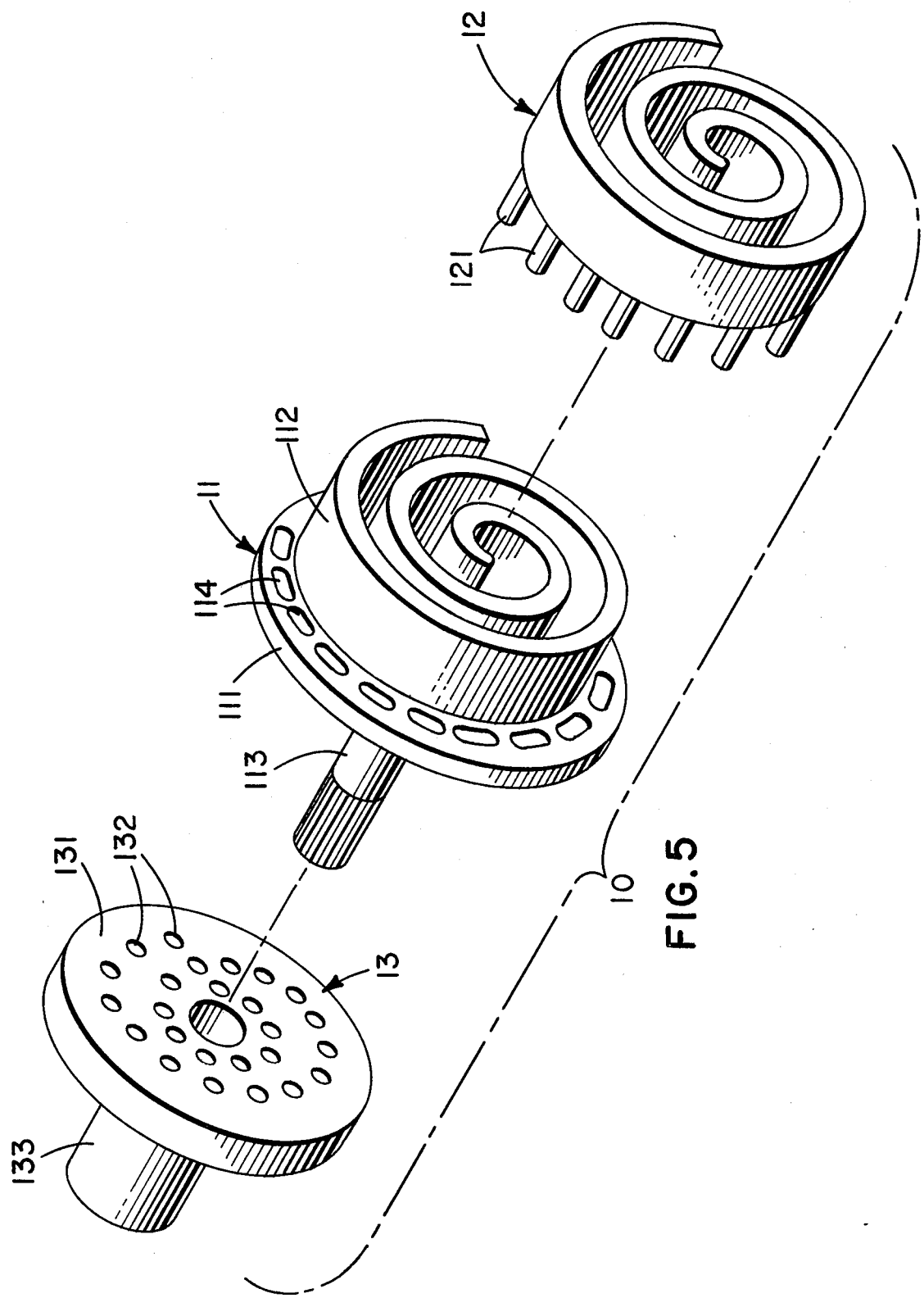
FIG. 5 is an exploded perspective view of a manufacturing tool according to the present invention.
Figure 6:
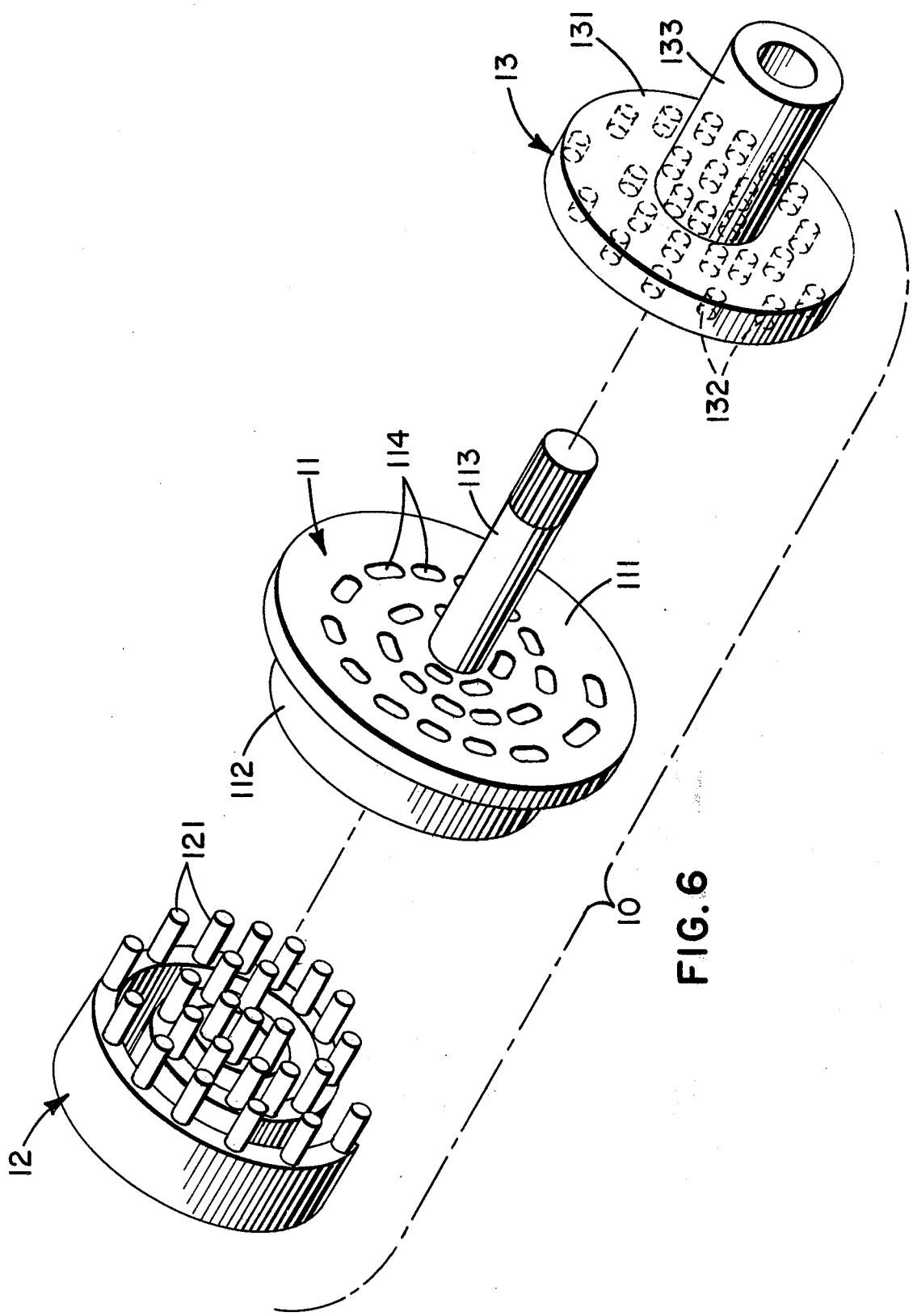
FIG. 6 is an exploded perspective view of the manufacturing tool of FIG. 5 as seen from the opposite side of FIG. 5.

Referring to FIGS. 5 and 6, a manufacturing tool 10 to finish a scroll in accordance with the present invention is shown. Tool 10 includes a working member 11 having a first involute element 112, a second involute element 12 having a plurality of pins 121 projecting from one of its axial end surfaces, and a rotatable member 13.

Working member 11 includes an end plate 111, a first involute element 112 affixed to or extending from one end surface of end plate 111, and a drive shaft 113 extending from the other opposite end surface of end plate 111. A plurality of arc shaped holes 114 are formed through the end plate 111 along the outer side wall of the first involute element 112. The outer and inner side walls of each arc shaped hole 114 consist of an arc shaped curve, the center of which are concentric with the center of first involute element 112. Second involute element 12 is rotatably coupled to working member 13 by pins 121 which extend through holes 114.

Rotatable member 13 includes a circular plate 131. A plurality of holes 132 extend into one end surface of plate 131 and a tubular shaft 133 extends from the other end surface. The axial end portions of pins 121 which extend through holes 114 of end plate 111 are received in holes 132 of circular plate 131. Tubular shaft 133 has a penetrating hole at its center for rotatably supporting drive shaft 113 of working member 11. The center of tubular shaft 133 is concentric with the center of drive shaft 113 of working member 11.

In this tool, the curve of second involute element 12 is formed in the same direction as the first involute element 112 and both involute elements 112 and 12 interfit with a radial gap defined between the facing side walls of the involute elements. Each pin 121 of second involute element 12 extends through a hole 114 of end plate 111 in such a manner as to be movable along the arc shaped direction of the hole. An axial end portion of each pin 121 which extends beyond hole 114 fits into a hole 132 of rotatable member 13. Therefore, second involute element 12 can be moved relative to first involute element 112 by the rotation of rotatable member 13 because pins 121 can move along the arc shaped direction of holes 114. However, the scope of rotation angle of second involute element 12, i.e., the amount which involute element 12 can rotate with respect to involute element 112, is limited by the boundaries of arc shaped hole 114, since pins 121 of second involute element 12 penetrate the arc shaped holes 114. Similarly, while working member 11 can be rotated, the scope of rotation angle of working member 11 is also limited by the boundaries of arc shaped holes 114. Working member 11 and second involute element 12 are thus able to rotate in opposite directions within the scope of a limited angle which is defined by the extent of arc shaped holes 114.

Figure 7:
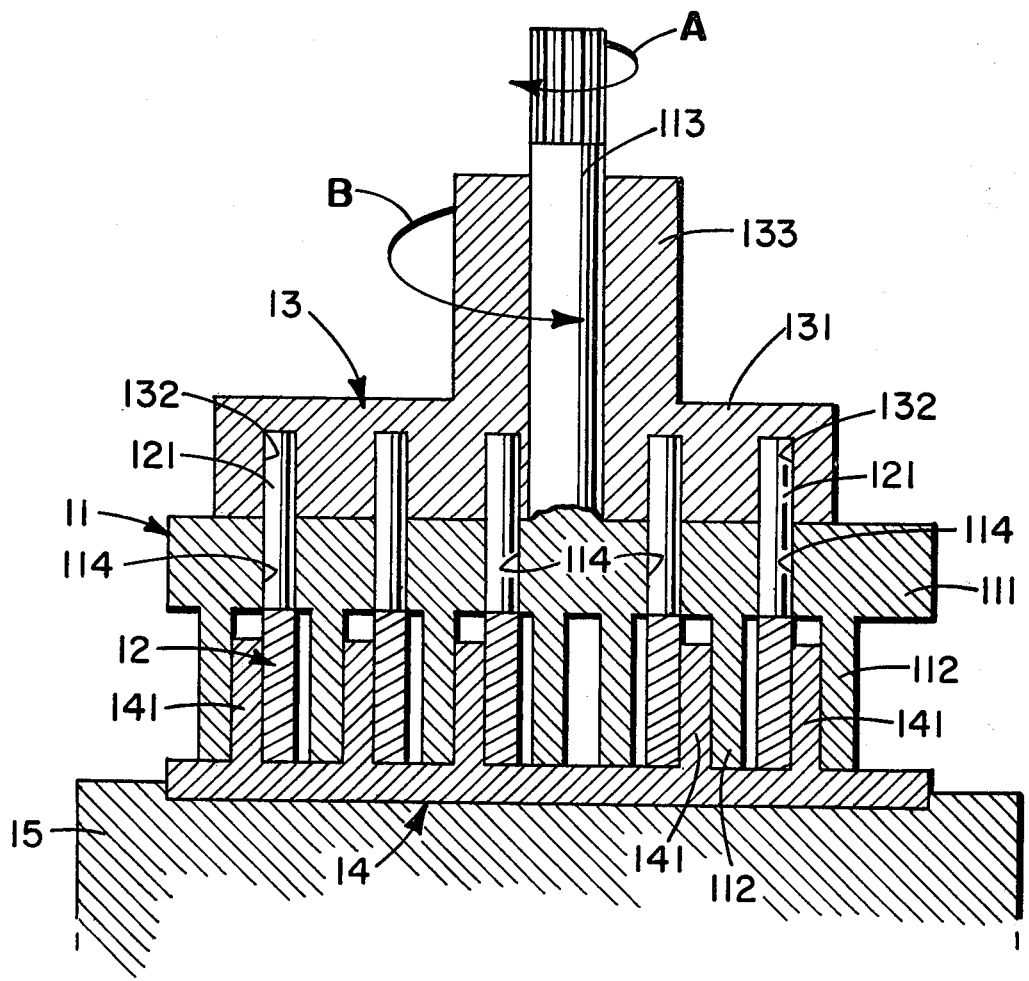
FIG. 7 is a sectional view of the assembled manufacturing tool of FIG. 5.

With reference to FIG. 7, a coining method using the above tool will be explained below.

As a first step, a second involute element 12 is placed on working member 11 so that involute elements 112, 12 interfit with a radial gap. Also, rotatable member 13 is located along the end surface of end plate 111 so that pins 121 of second involute element 12 extend into holes 132 of circular plate 131.

A preformed scroll 14, which has been precision formed as closely to the desired final dimensions and finish as possible, is fixedly disposed on a working table 15. An involute wrap or spiral element 141 of preformed scroll 14 is inserted into the gap between the inner side wall of first involute element 112 and the outer side wall of second involute element 12.

After spiral element 141 of preformed scroll 14 has been inserted in the gap, rotatable member 13 is rotated in a clockwise direction (shown by arrow B in FIG. 7) through tubular shaft 133. Second involute element 12 is thus rotated through pins 121 by rotation of rotatable member 13. Simultaneous with the rotation of second involute element 12 in a clockwise direction, working member 11 is rotated in a counterclockwise direction through drive shaft 113 (shown by arrow A in FIG. 7). First involute element 112 is thus moved by rotation of working member 11. The rotation angle of both involute elements 112, 12, however, is limited by pins 121 of second involute element 12 which extend through holes 114 of working member 11.

The relative rotation of working member 11 and second involute element 12 reduces the gap between the inner side wall of first involute element 112 and the outer side wall of second involute element 12. This reduction of the gap can be understood by reference to FIG. 3. As seen therein, if the starting point $P_2$ of involute surface II is rotated clockwise to be closer to the starting point $P_1$ of involute surface I, the angle $\beta$ is reduced and the distance d between surfaces I and II is also reduced.

Spiral element 141 of preformed scroll 14, which is disposed in that gap, is rolled by reduction of the gap. The surface of spiral element 141 is thus finished with uniform accuracy.

Figure 8:
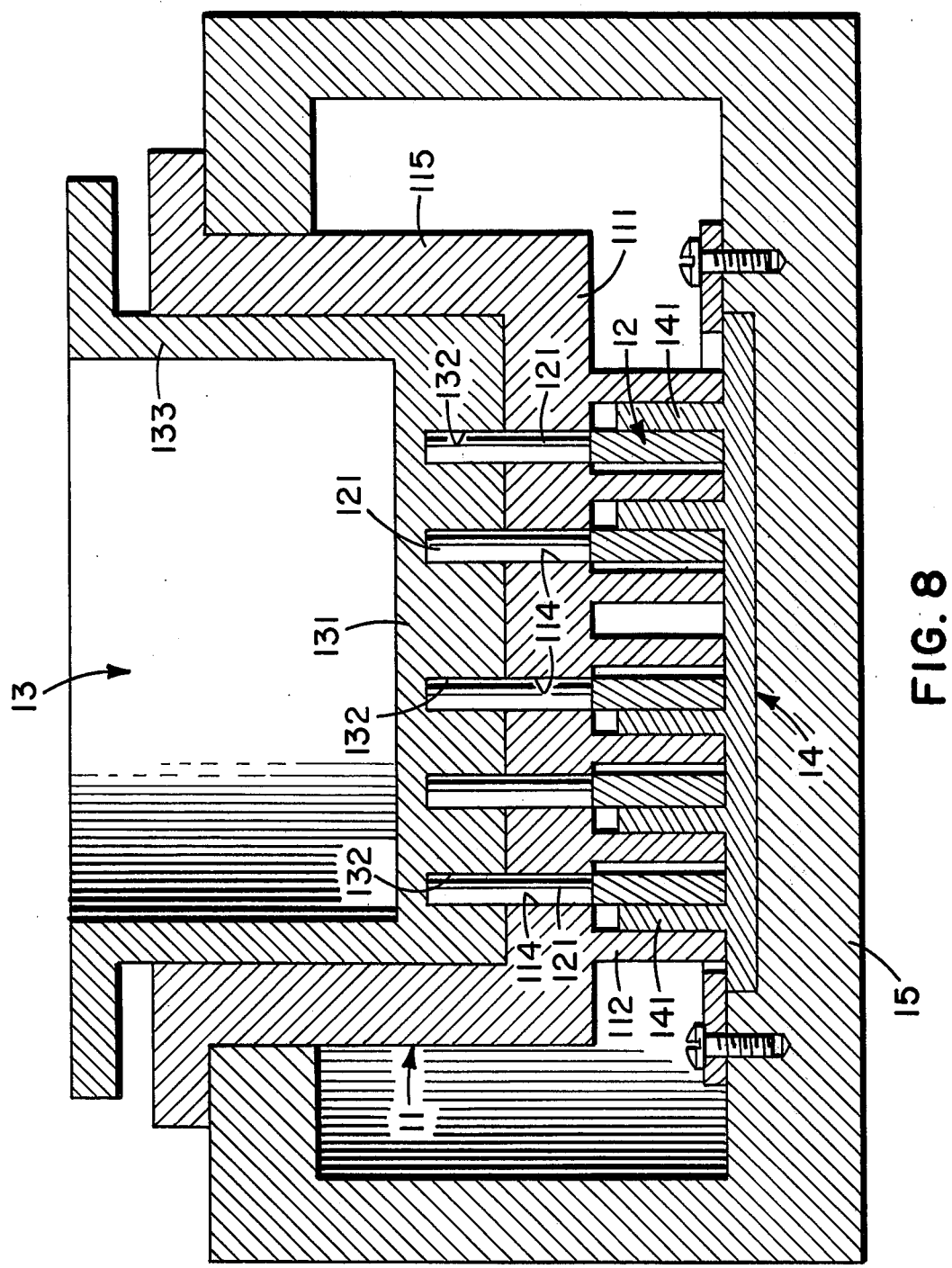
FIG. 8 is a sectional view of a manufacturing tool according to another embodiment of this invention.

FIG. 8 illustrates another embodiment of a tool in accordance with the present invention with a modified rotating mechanism for working member 11 and rotatable member 13.

End plate 111 of working member 11 has an annular arm portion 115 projecting axially from its outer peripheral surface. Rotatable member 13 has an annular arm portion 133 projecting axially from the outer peripheral surface of circular end plate 131. The arm portion 133 of circular end plate 131 rotatably fits in the inner side surface of arm portion 115 of working member 11. Arm portion 115 of working member 11 is rotatably supported by a supporting portion 151 of working table 15.

As described above, two involute elements, which have a same direct involute, interfit with a radial gap, and a spiral element of preformed scroll is inserted within that gap. After placement of the spiral element in the gap, at least one involute elements rotates to reduct the radial gap to thereby coin the side walls of the spiral element. This technique reduces the time for finishing the preformed scroll and results in high dimensional accuracy in the finished scroll.

This invention has been described in detail in connection with the preferred embodiment, but these are merely examples only and this invention is not limited thereto. It will be easily understood by those skilled in the art that variations and modifications can be easily made within the scope of this invention.

We claim:

1. A manufacturing tool for finishing a preformed scroll for use in a scroll type fluid displacement apparatus comprising:
   (a) a working member having an end plate, a first involute element extending from one end surface of said end plate, and a plurality of arc shaped holes along an outer side wall of said first involute element;
   (b) a second involute element rotatably coupled to said working member and interfitting with said first involute element in a disposition to define a radial gap between the first and second involute elements, and a plurality of pins projecting axially from an axial end of said second involute element and penetrating through said arc shaped holes, said pins being rotatably movable within said arc shaped holes; and
   (c) a rotatable member having a plurality of holes extending in the axial direction, said pins having axial end portions extending into said holes in said rotatable member to couple said rotatable member to said second involute member and to transmit the rotation of said rotatable member to said second involute element to effect relative rotation between said first and second involute elements to adjust said radial gap between an inner side wall of said first involute element and an outer side wall of said second involute element and thereby position said last-mentioned side walls into contact with said preformed scroll positioned in said radial gap to deform said scroll to finished dimensions.

2. A manufacturing tool in accordance with claim 1 wherein said rotatable member includes a plate disposed along an axial end surface of the end plate of said working member on a side opposite to the side from which said first involute element extends, said holes in said rotatable member extending into said plate of said rotatable member.

3. A manufacturing tool in accordance with claim 2 wherein a hollow tube extends from said rotatable member and a shaft extends from said end plate of said working member, said shaft extending into and being rotatable relative to said hollow tube.

4. A manufacturing tool in accordance with claim 2 wherein a first annular ring extends axially from the periphery of said end plate of said working member and a second annular ring extends axially from the periphery of the plate of said rotatable member, and second annular ring being rotatably received within said first annular ring.

* * * * *